(12) United States Patent
Neudecker et al.

(10) Patent No.: US 9,029,012 B2
(45) Date of Patent: *May 12, 2015

(54) THIN FILM ENCAPSULATION FOR THIN FILM BATTERIES AND OTHER DEVICES

(71) Applicant: Infinite Power Solutions, Inc., Littleton, CO (US)

(72) Inventors: Bernd J. Neudecker, Littleton, CO (US); Shawn W. Snyder, Golden, CO (US)

(73) Assignee: Sapurast Research LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/953,080

(22) Filed: Jul. 29, 2013

(65) Prior Publication Data

US 2013/0309556 A1 Nov. 21, 2013

Related U.S. Application Data

(63) Continuation of application No. 12/351,137, filed on Jan. 9, 2009, now Pat. No. 8,518,581.

(60) Provisional application No. 61/020,506, filed on Jan. 11, 2008.

(51) Int. Cl.
| | |
|---|---|
| *H01M 4/02* | (2006.01) |
| *H01M 2/08* | (2006.01) |
| *H01M 2/02* | (2006.01) |
| *H01M 2/10* | (2006.01) |
| *H01M 2/16* | (2006.01) |
| *H01M 4/38* | (2006.01) |
| *H01M 4/40* | (2006.01) |
| *H01M 4/485* | (2010.01) |
| *H01M 4/525* | (2010.01) |
| *H01M 4/66* | (2006.01) |
| *H01M 6/18* | (2006.01) |
| *H01M 6/40* | (2006.01) |
| *H01M 10/04* | (2006.01) |
| *H01M 10/052* | (2010.01) |
| *H01M 10/0562* | (2010.01) |

(52) U.S. Cl.
CPC .......... *H01M 2/0207* (2013.01); *H01M 2/0212* (2013.01); *H01M 2/0267* (2013.01); *H01M 2/027* (2013.01); *H01M 2/0275* (2013.01); *H01M 2/0285* (2013.01); *H01M 2/0287* (2013.01); *H01M 2/1094* (2013.01); *H01M 2/1653* (2013.01); *H01M 4/382* (2013.01); *H01M 4/405* (2013.01); *H01M 4/485* (2013.01); *H01M 4/525* (2013.01); *H01M 4/661* (2013.01); *H01M 4/664* (2013.01); *H01M 4/667* (2013.01); *H01M 6/185* (2013.01); *H01M 6/40* (2013.01); *H01M 10/0436* (2013.01); *H01M 10/052* (2013.01); *H01M 10/0562* (2013.01); *H01M 2300/0068* (2013.01); *Y02E 60/122* (2013.01)

(58) Field of Classification Search
USPC ................................................ 429/185, 209
See application file for complete search history.

(56) References Cited

U.S. PATENT DOCUMENTS

| | | | |
|---|---|---|---|
| 5,561,004 | A | 10/1996 | Bates et al. |
| 6,080,508 | A | 6/2000 | Dasgupta et al. |
| 6,916,679 | B2 | 7/2005 | Snyder et al. |
| 7,088,031 | B2 | 8/2006 | Brantner et al. |
| 8,021,778 | B2 | 9/2011 | Snyder et al. |
| 8,236,443 | B2 | 8/2012 | Snyder et al. |
| 8,445,130 | B2 | 5/2013 | Neudecker et al. |
| 2004/0048157 | A1* | 3/2004 | Neudecker et al. ........ 429/231.2 |
| 2005/0186469 | A1* | 8/2005 | De Jonghe et al. ........... 429/137 |
| 2006/0286448 | A1* | 12/2006 | Snyder et al. ................. 429/176 |
| 2007/0184345 | A1* | 8/2007 | Neudecker et al. ........... 429/209 |
| 2007/0264564 | A1* | 11/2007 | Johnson et al. ............... 429/161 |
| 2008/0003496 | A1 | 1/2008 | Neudecker et al. |

OTHER PUBLICATIONS

Extended European Search Report issued in related European Application Serial No. 097013359.3, dated Jul. 23, 2012.

* cited by examiner

*Primary Examiner* — Muhammad Siddiquee
(74) *Attorney, Agent, or Firm* — Blakely, Sokoloff, Taylor & Zafman LLP

(57) ABSTRACT

An electrochemical device is claimed and disclosed, including a method of manufacturing the same, comprising an environmentally sensitive material, such as, for example, a lithium anode; and a plurality of alternating thin metallic and ceramic, blocking sub-layers. The multiple metallic and ceramic, blocking sub-layers encapsulate the environmentally sensitive material. The device may include a stress modulating layer, such as for example, a Lipon layer between the environmentally sensitive material and the encapsulation layer.

20 Claims, 1 Drawing Sheet

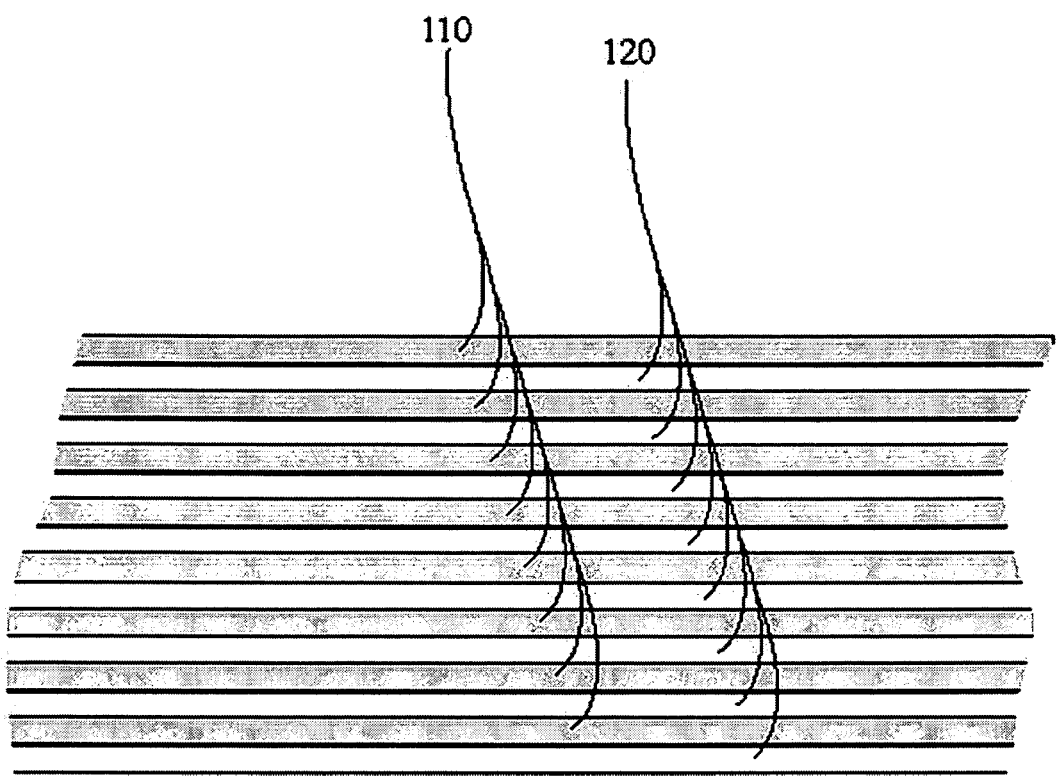

US 9,029,012 B2

THIN FILM ENCAPSULATION FOR THIN FILM BATTERIES AND OTHER DEVICES

RELATED APPLICATION(S)

The present application is a continuation and claims the benefit under 34 U.S.C. §120 of U.S. patent application Ser. No. 12/351,137, filed Jan. 9, 2009 (allowed), which claims priority under 35 U.S.C. §119 to U.S. provisional patent application Ser. No. 61/020,506, filed Jan. 11, 2008, all of which are incorporated herein by reference in its entirety.

FIELD OF THE INVENTION

The field of this invention is the device, composition, method of depositing, encapsulation and fabrication of solid-state, thin-film, secondary and primary electrochemical devices, including batteries.

BACKGROUND OF THE INVENTION

Thin-film batteries (TFBs) typically may require a high-performance hermetic encapsulation that protects them against ambient chemical reactants (such as, for example, )$O_2$, $H_2O$, $N_2$, $CO_2$, etc.) over many years of life time. The quality requirements for the encapsulation may be independent of the material choice of the most sensitive component in a thin-film battery, the anode (metallic lithium, lithium-ion [e.g. carbon or tin nitride], or "Li-free" anode [=current collector at which metallic lithium is plated out during TFB operation]), because any of these anodes may cease to work after a comparable amount of long-term, accumulated transmission of reactants into the TFB. For a 10-year shelf-life expectancy, for instance, the encapsulation should preferably exhibit a water vapor transmission rate (WVTR) of less than $10^{-3}$ g/m$^2$-day while the oxygen transmission rate (OTR) should preferably be smaller than $5 \times 10^{-4}$ g/m$^2$-day. These estimated quantities are based on the complete reaction of $1.6 \times 10^{-4}$ g/cm$^2$ of lithium metal or lithium ions in the anode to either LiOH or $Li_2O$. Furthermore, these estimated quantities represent practical rates and include reactants ingress (transmission) along the encapsulation-TFB seal area, in addition to the typical transmission rates that are measured only vertically through the encapsulation by the MOCON method.

However, current non-thin-film encapsulation is generally responsible for nearly 50% or more of the overall thickness of standard TFBs. When adjoining TFBs into a battery stack for applications for which the supply of a maximum of energy within a given thickness is critical, one can not afford to waste 50% of the stack volume on non-energy providing encapsulation.

Thus, a need exists for the encapsulation thickness to be reduced to a minimum without compromising the protection performance.

SUMMARY OF THE INVENTION

The invention pertains to, for example, a high-performance thin-film encapsulation for devices such as thin-film batteries that allows for the encapsulated devices to be fabricated much thinner than before while substantially increasing their high-temperature stability. The described approach is based on a multilayer thin-film encapsulation whose constituent sub-units comprise, for example, alternating metal getter/metal nitride diffusion blocker sub-layers, which are substantially impenetrable by oxygen and moisture.

In one embodiment, the encapsulated device is a thin-film battery with a cathode of a thickness that is greater than about 0.5 μm and less than about 200 μm. The electrolyte may be less than, for example, about 5 μm thick. The anode may be greater than, for example, about 0.1 μm and less than 30 μm thick. Also, the encapsulating layer may have alternating metal sub-layers and ceramic, blocking sub-layers which may each be at least about 500 angstroms thick. Furthermore, the alternating metal and ceramic blocking sub-layers may, for instance, comprise at least two blocking sub-layers and two metal sub-layers. Finally, in at least one embodiment, the total thickness of every metal sub-layer and every ceramic blocking sub-layer combined may be less than about 5 μm.

In another embodiment, the encapsulated device is a battery and employs the battery-type and thin-film encapsulation described in the previous paragraph and stacks a plurality of cells. A total thickness for a five-cell stack may preferably be generally less than about 0.5 mm.

BRIEF DESCRIPTION OF FIGURE

FIG. 1 shows a section of a multilayer thin film used to encapsulate an electrochemical device according to an embodiment of the present invention.

DETAILED DESCRIPTION

FIG. 1 shows a section of a multilayered thin film used to encapsulate an electrochemical device according to one embodiment of the present invention. The thin encapsulation material may comprise, for example, multiple strong metallic getter sub-layers 110 with alternating amorphous or glassy oxide or nitride ceramic blocking sub-layers 120. The strong metallic getter sub-layers 110 may be used, for example, to protect the device from moisture and oxygen. The strong metallic sub-layers may, for example, be comprised of Zr, Y, Ti, Cr, Al, or any alloy thereof. The amorphous or glassy ceramic blocking sub-layers 120 may be oxides, nitrides, carbides, silicides, or borides of the metal or metals used in the getter sub-layers, such as, for example, $ZrO_2$, ZrN, ZrC, $ZrB_2$, ZrSi, $Y_2O_3$, YN, YC, $YB_6$, YSi, $TiO_2$, TiN, TiC, $TiB_2$, TiSi, $Cr_2O_3$, CrN, $Cr_3C_2$, $CrB_2$, CrSi, $Al_2O_3$, AN, $Al_4C_3$, $AlB_2$, $Al_4Si_3$, or any multi-element compound thereof. The amorphous or glassy sub-layers of these rather covalently bonded materials are typically densely packed arrangements of the constituent atoms while allowing very limited or no diffusion of moisture or oxygen through their bulk. As a result, this multilayered thin film may effectively block, for example, any moisture or oxygen diffusion through its bulk and along its interfaces and may also protect the underlying, air sensitive metallic anode. Furthermore, the sub-layers may have a combined thickness that is sufficient to frustrate oxygen and moisture penetration.

Among certain available materials, a layer of metal (sheet, foil, or thin films) may provide the most efficient protection against oxygen and moisture, particularly when the metal can be hermetically sealed around the environmentally-sensitive body. Specifically, for the protection of thin-film devices it would be most preferable to apply a metallic thin film encapsulation that creates a tent-like construction over a device having a substrate and attaching the encapsulation to the substrate along a surface next to the device in a tightly-sealed fashion.

The optimized encapsulation approach specifically designed for TFBs consists of a multilayer construction formed by a plurality of thin metal sub-layers with alternating amorphous or glassy inorganic oxide and/or nitride and/or carbides, and/or silicides, and/or borides sub-layers that exhibit little or no grain structure. In particular, certain "grainless" nitrides, carbides, silicides, and borides possess very dense material morphologies that effectively block the diffusion paths for any oxygen and/or moisture that may have penetrated the neighboring thin metal sub-layers.

In an embodiment in the present invention, metals may be chosen from well known $O_2$ and/or $H_2O$ getters, such as Zr, Y, Ti, Cr, Al, and/or alloys thereof The diffusion blocking, inorganic amorphous or glassy sub-layers may be selected from materials such as $ZrO_2$, ZrN, $Y_2O_3$, YN, $Cr_2O_3$, CrN, $Al_2O_3$, AN, and/or multinary compound compositions and derivatives thereof, such as $TiAlN_xO_y$.

These thin-film encapsulation sub-layers can be deposited by, for example, metal sputtering with alternating compound deposition using one single sputter cathode in one vacuum deposition chamber without sample change. This may be performed by simply switching back and forth between Ar and Ar—$N_2$—$O_2$ sputtering of the same metal (e.g., TiAl). The result may be a 3 μm thick, 30-layer construction of 0.1 μm TiAl/0.1 μm $TiAlN_xO_y$/0.1 μm TiAl/0.1 μm $TiAlN_xO_y$/ . . . , which may be difficult for $O_2$ and $H_2O$ to penetrate or permeate in vertical direction. To avoid compromising this high-performance encapsulation through seal leaks at the encapsulation-substrate interface (seal area), specific attention may be given to the substantially defect-free deposition of these layers in the seal area. This objective may be accomplished through an appropriately prepared substrate surface and a substantially flawless thin-film layer deposition.

This type of multilayer thin-film encapsulation embodiment may not only preferably be about 3 μm thin (reduces the thickness of the TFB from 150 μm to about 80 μm) but may also be as substantially flexible as any of the other battery component layers, such as the 3 μm $LiCoO_2$ cathode. Fine-tuning of the flexibility of the multilayer thin-film encapsulation may be achieved through a change in physical vapor deposition (PVD) parameters and/or change in materials selection, such as resorting to $Zr/ZrN/Zr/Zr_2N/Zr/ZrN/Zr$ . . . instead of $TiAl/TiAlN_xO_y/TiAl/$ . . . .

A metallic lithium anode is chemically stable with, for instance, Zr and/or ZrN. However, the metallic lithium anode can be soft and, as it is known of most anode materials today, may be susceptible to substantial expansion and contraction during TFB operation. Mechanical features such as these can be challenging for the multilayer thin-film encapsulation, potentially causing cracks due to stress imbalance at the lithium anode/encapsulation interface. Once the encapsulation is cracked, the underlying lithium anode may be exposed to air and thus may chemically deteriorate.

To counteract this stress imbalance, a stress modulating layer, such as a thin-film layer of Lipon, may be introduced between the metallic lithium anode and the multilayer thin-film encapsulation. Lipon has been proven to be chemically and mechanically stable with TiAl, $TiAlN_xO_y$, Zr, ZrN, etc., as well as with lithium alloys, lithium solid solutions, and metallic lithium. The Lipon electrolyte layer that is located underneath the metallic lithium anode, together with the overlying Lipon stress modulation layer, can confine the interposed metallic lithium anode while protecting it, not only mechanically but also chemically, as Lipon is compatible with metallic lithium. In this configuration where the metallic lithium anode is confined within the layers of Lipon, it may remain fixed within its location and electrochemically intact even when heated above its melting point of 181° C. This engineering design of some embodiments utilizing this configuration may enable the TFB to be used in solder reflow or flip chip processing. Aided through this design, the multilayer thin-film encapsulation does not only provide the TFB with much less thickness but also with a much higher temperature stability (>150° C. continuous) than the surlyn/metal foil encapsulation currently used in industry.

In other embodiments, alloys or solid solutions of lithium (e.g. $Li_xCu$, $Li_xZr$, $Li_xV$, $Li_xW$), which electrochemically behave very similar to a metallic lithium anode, may be used as the anode, offering stronger mechanical properties compared to the soft lithium anode, thereby allowing the direct deposition of the multilayer thin-film encapsulation without the use of the Lipon stress modulation layer. The resulting multilayer thin-film encapsulation may still allow the TFB to maintain a high temperature stability (>150° C. continuous), just as the one configured with the Lipon stress modulation layer.

Once the multilayer thin-film encapsulation in certain embodiments is demonstrated to be chemically and mechanically stable with the metallic lithium anode, or lithium alloy, under TFB operation, the present invention in certain embodiments may deposition-pattern the multilayer thin-film encapsulation in a fashion that renders it selectively conducting and insulating in other areas. This way, the multilayer thin-film encapsulation can also serve as the anode current collector, or negative terminal, without short-circuiting the TFB through the metallic substrate, which is configured as the positive terminal in IPS' TFBs fabricated on metal foil.

EXAMPLES OF EMBODIMENTS

Example 1

Some embodiments use the encapsulation method described to protect a lithium anode from moisture and air. These embodiments comprise a 1 in² metal foil substrate measuring approximately 50 μm in thickness. A 0.5 μm thick conductive barrier layer is disposed on at least one surface of the substrate using one of the methods generally available to one ordinarily skilled in the art in addition to those described here. A 3.5 μm thick $LiCoO_2$ positive cathode is disposed onto the conductive barrier layer. A 1.2 μm thick Lipon electrolyte layer is disposed onto the cathode layer and a 9 μm thick Li anode is disposed onto the electrolyte. A 3 μm thick thin-film multilayer encapsulation, consisting of 15 sub-layers of 0.1 gm Zr alternated with 15 sub-layers of 0.1 μm of ZrN, is then disposed on the layered device. This specific embodiment can achieve 500 h in 85° C./85% RH environment.

Example 2

Other embodiments may combine five of the encapsulated battery cells discussed previously. This embodiment generally has a total thickness less than 0.5 mm and supplies 2.5 mAh at ½ C rate at 25° C. between 4.2-2.0V.

Example 3

Yet other embodiments of the present invention comprise a 0.5 μm conductive barrier layer, a $LiCoO_2$ positive cathode with a thickness of about 12 μm, a 1.2 μm Lipon electrolyte layer, a Li anode with a thickness of about 10 μm, and a 2 μm thick Lipon modulator layer on top of the Li anode. These embodiments may be fabricated on a 50 μm metal foil substrate of 1 in² in area and encapsulated by a 3 μm thin-film encapsulation. This embodiment has a total thickness of less than 80 μm and generally supplies 2 mAh at ½ C rate at 25° C. between 4.2-2.0V.

Example 4

Further, other embodiments of the present invention may comprise the electrochemical device from Example 1. Due to the high-melting point of Zr—ZrN (>>1000° C.), the encapsulation is capable of withstanding temperatures of up to 265° C.—the maximum temperature encountered in lead-free solder reflow processing—for extended periods of time. This chemical and physical stability of the electrochemical device is achieved despite the melting of the metallic lithium anode that does, however, not react with Zr or ZrN under these conditions.

Example 5

Yet, other embodiments of the present invention comprise a selectively conductive encapsulation wherein, through thin-film deposition patterning such as may be accomplished by shadow-masking, certain areas of the encapsulation are made electrically conductive while some others are fabricated electrically insulating. The electrically conductive areas comprise metallic sub-layers and/or electrically conductive ceramic sub-layers while the electrically insulating areas comprise ceramic non-conducting sub-layers, such as, for instance $ZrO_2$. The selectively conductive encapsulation allows it to be used as an electrical terminal of the electrochemical device.

It is to be understood that the present invention is not limited to the particular methodology, compounds, materials, manufacturing techniques, uses, and applications described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures.

All patents and other publications identified are incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason.

The embodiments described above are exemplary only. One skilled in the art may recognize variations from the embodiments specifically described here, which are intended to be within the scope of this disclosure. As such, the invention is limited only by the following claims. Thus, it is intended that the present invention cover the modifications of this invention provided they come within the scope of the appended claims and their equivalents. Further, specific explanations or theories regarding the formation or performance of electrochemical devices according to the present invention are presented for explanation only and are not to be considered limiting with respect to the scope of the present disclosure or the claims.

What is claimed is:

1. An electrochemical device comprising:
   a $LiCoO_2$ layer;
   a first Lipon layer deposited on said $LiCoO_2$ layer;
   a lithium layer deposited on said first Lipon layer;
   a second Lipon layer deposited on said lithium layer; and
   an encapsulation layer, comprising a plurality of alternating metallic and ceramic sub-layers, deposited on said second Lipon layer, at least one area of said encapsulation layer corresponding to an anode is selectively conductive and another area is insulating.

2. The electrochemical device of claim 1, wherein said metallic sub-layers comprise at least one element selected from the group comprising:
   scandium, yttrium, lanthanum, titanium, zirconium, hafnium, vanadium, niobium, tantalum, chromium, molybdenum, tungsten, manganese, iron, cobalt, nickel, copper, zinc, boron, aluminum, carbon, silicon, germanium, beryllium, magnesium, calcium, strontium, barium, lithium, sodium, potassium, rubidium, and caesium.

3. The electrochemical device of claim 1, wherein said ceramic sub-layers comprise nitrides of at least one element selected from the group comprising:
   scandium, yttrium, lanthanum, titanium, zirconium, hafnium, vanadium, niobium, tantalum, chromium, molybdenum, tungsten, manganese, iron, cobalt, nickel, copper, zinc, boron, aluminum, carbon, silicon, germanium, beryllium, magnesium, calcium, strontium, barium, lithium, sodium, potassium, rubidium, and caesium.

4. The electrochemical device of claim 1, wherein said ceramic sub-layers comprise oxides of at least one element selected from the group comprising:
   scandium, yttrium, lanthanum, titanium, zirconium, hafnium, vanadium, niobium, tantalum, chromium, molybdenum, tungsten, manganese, iron, cobalt, nickel, copper, zinc, boron, aluminum, carbon, silicon, germanium, beryllium, magnesium, calcium, strontium, barium, lithium, sodium, potassium, rubidium, and caesium.

5. The electrochemical device of claim 1, wherein said ceramic sub-layers comprise carbides of at least one element selected from the group comprising:
   scandium, yttrium, lanthanum, titanium, zirconium, hafnium, vanadium, niobium, tantalum, chromium, molybdenum, tungsten, manganese, iron, cobalt, nickel, copper, zinc, boron, aluminum, silicon, germanium, beryllium, magnesium, calcium, strontium, barium, lithium, sodium, potassium, rubidium, and caesium.

6. The electrochemical device of claim 1, wherein said ceramic sub-layers comprise silicides of at least one element selected from the group comprising:

scandium, yttrium, lanthanum, titanium, zirconium, hafnium, vanadium, niobium, tantalum, chromium, molybdenum, tungsten, manganese, iron, cobalt, nickel, copper, zinc, boron, aluminum, carbon, germanium, beryllium, magnesium, calcium, strontium, barium, lithium, sodium, potassium, rubidium, and caesium.

7. The electrochemical device of claim 1, wherein said ceramic sub-layers comprise borides of at least one element selected from the group comprising:

scandium, yttrium, lanthanum, titanium, zirconium, hafnium, vanadium, niobium, tantalum, chromium, molybdenum, tungsten, manganese, iron, cobalt, nickel, copper, zinc, aluminum, carbon, silicon, germanium, beryllium, magnesium, calcium, strontium, barium, lithium, sodium, potassium, rubidium, and caesium.

8. The electrochemical device of claim 1, wherein said environmentally sensitive layer comprises at least one material selected from the group consisting of:

lithium alloy, lithium solid solution, metallic lithium, titanium, vanadium, chromium, manganese, iron, cobalt, nickel, copper, zinc, zirconium, niobium, molybdenum, palladium, silver, hafnium, tantalum, tungsten, iridium, platinum, gold, beryllium, magnesium, calcium, strontium, barium, boron, aluminum, indium, carbon, silicon, germanium, tin, lead, phosphorus, arsenic, antimony, and bismuth.

9. The electrochemical device of claim 1, wherein at least one sub-layer of said encapsulation layer is deposited using sputtering from a metallic target.

10. The electrochemical device of claim 1, wherein at least one sub-layer of said encapsulation layer is deposited using a dual sputter cathode deposition method.

11. The electrochemical device of claim 1, wherein said at least one area of the encapsulation layer serves as one electrical terminal of said device.

12. The electrochemical device of claim 1, wherein said encapsulation layer is flexible.

13. The electrochemical device of claim 1, wherein said alternating metallic and blocking layers comprise at least two metallic sub-layers and at least two ceramic sub-layers, respectively.

14. The electrochemical device of claim 1, wherein the total thickness of every metallic layer and every ceramic layer is less than about 5 μm.

15. An electrochemical device comprising:
a cathode;
an electrolyte deposited on said cathode;
a soft, environmentally sensitive anode deposited on said electrolyte;
a modulating layer on said anode; and
an encapsulation layer, comprising a plurality of alternating metallic and ceramic sub-layers, deposited on said modulating layer,
wherein at least one area of said encapsulation layer corresponding to the anode is selectively conductive and another area is insulating.

16. The electrochemical device of claim 15, wherein said alternating metallic and blocking layers comprise at least two metallic sub-layers and at least two ceramic sub-layers, respectively.

17. The electrochemical device of claim 16, wherein the total thickness of every metallic layer and every ceramic layer is less than about 5 μm.

18. An electrochemical device comprising:
a cathode greater than about 0.5 μm and less than about 200 μm thick;
an electrolyte less than about 5 μm thick;
an anode greater than about 0.1 μm and less than about 30 μm thick;
a plurality of alternating metallic and ceramic sub-layers; and
wherein at least one area of said plurality of alternating metallic and ceramic sub-layers corresponding to the anode is selectively conductive and another area is insulating.

19. The electrochemical device of claim 18, wherein said alternating metallic and blocking layers comprise at least two metallic sub-layers and at least two ceramic sub-layers, respectively.

20. The electrochemical device of claim 19, wherein the total thickness of every metallic layer and every ceramic layer is less than about 5 μm.

* * * * *